(12) United States Patent  
Tasa et al.

(10) Patent No.: US 8,081,601 B2  
(45) Date of Patent: Dec. 20, 2011

(54) USE OF OUT-OF-BAND SIGNALING FOR WIRELESS COMMUNICATION NETWORK TO ENHANCE SEARCH AND ENTRY

(75) Inventors: Mikko J. Tasa, Tampere (FI); Tommi O. Rantanen, Tampere (FI); Jukka S. Ala-Vannesluoma, Tampere (FI)

(73) Assignee: Nokia Corporation, Espoo (FI)

( * ) Notice: Subject to any disclaimer, the term of this patent is extended or adjusted under 35 U.S.C. 154(b) by 809 days.

(21) Appl. No.: 12/156,352

(22) Filed: May 30, 2008

(65) Prior Publication Data

US 2009/0296681 A1    Dec. 3, 2009

(51) Int. Cl.  
*H04W 4/00*    (2009.01)

(52) U.S. Cl. ........................ 370/330; 455/434; 455/435.1

(58) Field of Classification Search .................. None  
See application file for complete search history.

(56) References Cited

U.S. PATENT DOCUMENTS

| | | | | |
|---|---|---|---|---|
| 6,473,410 | B1 * | 10/2002 | Sakoda et al. | 370/330 |
| 7,006,469 | B1 * | 2/2006 | Roark et al. | 370/330 |
| 7,385,953 | B2 * | 6/2008 | Ho et al. | 370/330 |
| 7,706,324 | B2 * | 4/2010 | Sutivong et al. | 370/330 |
| 7,873,010 | B2 * | 1/2011 | Love et al. | 370/330 |
| 2003/0194016 | A1 * | 10/2003 | Gorecki et al. | 375/268 |
| 2009/0219882 | A1 * | 9/2009 | Kim et al. | 370/330 |

OTHER PUBLICATIONS

IEEE 802.16-2004; Air Interface for Fixed Broadband Wireless Access Systems, Oct. 1, 2004, cited excerpts.*

* cited by examiner

*Primary Examiner* — Chi Pham  
*Assistant Examiner* — David S Andreasen  
(74) *Attorney, Agent, or Firm* — Harrington & Smith

(57) ABSTRACT

A method, apparatus and computer program operate so as to formulate a request at a terminal for a network access node to transmit a broadcast message; to transmit the request on an out-of-band radio channel for reception by the network access node; and to receive the broadcast message prior to a next scheduled time for the broadcast message to be transmitted. The network may be a WiMAX network, and the broadcast message may be at least one of a downlink channel descriptor/uplink channel descriptor and system identity information advertisement message. Also disclosed is a corresponding network access node that operates so as to receive a request from at least one terminal, where the request is a request to transmit a broadcast message and is received on an out-of-band radio channel. The network access node responds by transmitting the broadcast message prior to a next scheduled time for the broadcast message to be transmitted.

38 Claims, 6 Drawing Sheets

LOCATION OF OUT-OF-BAND SIGNALING CHANNEL OUTSIDE NORMAL CHANNEL

EXAMPLE OF BIT PATTERN/MESSAGE SELECTION

USE OF OUT-OF-BAND SIGNALING FOR WIRELESS COMMUNICATION NETWORK TO ENHANCE SEARCH AND ENTRY

TECHNICAL FIELD

The exemplary and non-limiting embodiments of this invention relate generally to wireless communication systems, methods, devices and computer programs and, more specifically, relate to wireless communication networks, such as WiMAX networks, and to out-of-band signaling.

BACKGROUND

Various abbreviations that appear in the specification and/or in the drawing figures are defined as follows:

| | |
|---|---|
| ASN | access service network |
| BS | base station |
| CSN | connectivity service network |
| DCD | downlink channel descriptor (holds parameters that terminals need to begin communicating with base station) |
| DL | downlink (BS to terminal) |
| ID | identifier |
| IP | internet protocol |
| MAC | medium access control |
| NAP | network access provider (a company owning base stations and providing access to NSP(s)) |
| NSP | network service provider (a company owning "core" network, which provides access to internet) |
| SII-ADV | system identity information advertisement (message) |
| UCD | uplink channel descriptor (holds parameters that terminals need to begin communicating with base station) |
| UL | uplink (terminal to BS) |
| WiMAX | worldwide interoperability for microwave access |

WiMAX is a name given to a set of technologies sponsored by the WiMAX Forum. WiMAX was originally designed to provide a wireless alternative to broadband cable connections. Originally WiMAX was only able to operate with fixed or nomadic terminals, as handovers from cell to cell were not supported. WiMAX has subsequently evolved towards supporting full terminal mobility. Consequently, WiMAX has emerged as one of the most prominent 4G technologies for use in mobile communication, and is capable of supporting an entire range of services from voice to broadband data on top of IP protocol.

There are various phases of a WiMAX network (NSP) search. The end user typically requires a NSP search when the user wants to locate a WiMAX operator (a NSP) to make a subscription in order to be able to enter the network and obtain IP connectivity. The phases in the NSP search are as follows:

1. The terminal (also referred to as a mobile station) searches the frequencies for base stations.

2. Once a base station is found, the terminal identifies the NAP to which the base station belongs. If a full BS ID is included in each frame, the NAP can be identified from the first received frame. However, if a "truncated" BS ID is used by the base station then the full NAP ID is available only in the DCD message (see step 3) and the terminal may thus need to wait to receive the DCD.

3. If NSP connections from the found NAP are not yet known (NSP connections are the same for all base stations of the same NAP), the terminal waits for the base station to broadcast parameters needed for communications (namely DCD and UCD messages). The base station is required to broadcast these messages at least once every 10 seconds.

4. After the DCD and UCD are received, the terminal carries out ranging to the BS in order to adjust the terminal's transmit power and timing to correct values.

5. Upon successful ranging, the terminal initiates capability negotiations. At this point, the terminal is able to query which NSPs are reachable through the NAP. NSP names (that can be displayed for the end user) can be received at this phase.

The foregoing steps are repeated until NSPs for all found NAPs are discovered.

The phases of WiMAX network entry are as follows. Once the end user has subscribed to a service from one of the WiMAX operators (NSP), the terminal is enabled to enter the network based on settings provisioned by the operator. The settings include authentication credentials, priorities for NAPs, a set of frequencies where to look first for the NAPs, and so forth. The terminal then automatically selects a NAP to be used when entry to the network is ordered. The phases are:

1. The terminal searches the set of frequencies for base stations.

2. Once a base station is found, the NAP of the base station is discovered. The NAP is compared against provisioned settings in order to determine whether it can be used for making the connection to the network. Note that in case the "truncated" BS ID is used by the base station, the terminal may have to wait for the DCD message (see step 3)

3. Upon finding a suitable NAP for connection, the terminal waits for the base station to broadcast parameters needed for communication (namely DCD and UCD messages). As was noted above, the base station is required to broadcast this information at least once every 10 seconds.

4. Once the parameters are received capability negotiations are carried out.

5. Capability negotiation is followed by the authentication phase where the subscriber is identified and authenticated to the network 6. Upon successful authentication, the terminal registers to the network.

7. Service flows, which can be used for IP data transfer, are created.

8. The terminal then acquires IP connectivity.

As may be appreciated, the terminal having to wait for DCD and UCD messages slows down both network entry and the NSP search (and also the NAP discovery phase if the "truncated" BS ID is used). If the usage model is such that network is entered only when some application requires IP connectivity, the speed of network search and entry are important at least with regard to the user experience.

SUMMARY

The foregoing and other problems are overcome, and other advantages are realized, by the use of the exemplary embodiments of this invention.

In a first aspect thereof the exemplary embodiments of this invention provide a method that includes formulating a request to transmit a broadcast message; transmitting the request on an out-of-band radio channel; and receiving the broadcast message prior to a next scheduled time for the broadcast message to be transmitted.

In another aspect thereof the exemplary embodiments of this invention provide a memory medium that stores computer program instructions. The execution of the computer program instructions results in operations that comprise formulating a request to transmit a broadcast message; transmitting the request on an out-of-band radio channel; and receiving the broadcast message prior to a next scheduled time for the broadcast message to be transmitted.

In another aspect thereof the exemplary embodiments of this invention provide an apparatus that includes a controller configured to formulate a request for a network access node to transmit a broadcast message. The controller is coupled with a transmitter configured to transmit the request on an out-of-band radio channel for reception by the network access node, and is further coupled with a receiver configured to receive the broadcast message prior to a next scheduled time for the broadcast message to be transmitted.

The apparatus referred to above may be embodied at least partially in at least one integrated circuit.

In another aspect thereof the exemplary embodiments of this invention provide a method that includes receiving a request to transmit a broadcast message that is received on an out-of-band radio channel. The method further includes transmitting the broadcast message prior to a next scheduled time for the broadcast message to be transmitted.

In another aspect thereof the exemplary embodiments of this invention provide a memory medium that stores computer program instructions. The execution of the computer program instructions results in operations that comprise: receiving a request to transmit a broadcast message, the request being received on an out-of-band radio channel; and transmitting the broadcast message prior to a next scheduled time for the broadcast message to be transmitted.

In a further aspect thereof the exemplary embodiments of this invention provide an apparatus that includes a controller that comprises part of a network access node and that is coupled with a receiver configured to receive a request from at least one terminal, the request being a request to transmit a broadcast message and the request is received on an out-of-band radio channel. The controller is further coupled with a transmitter configured to transmit the broadcast message prior to a next scheduled time for the broadcast message to be transmitted.

The apparatus referred to above may be embodied at least partially in at least one integrated circuit.

DETAILED DESCRIPTION

The exemplary embodiments of this invention provide an out-of-band signaling mechanism for terminals to request base stations to broadcast (at least) DCD and UCD messages that are needed by the terminal in order to initiate communicating with the base station. The same mechanism may be utilized also for requesting the base station to broadcast a SII-ADV message that contains information regarding NSPs that are reachable through the base station. Note that the information can be requested as well in the capability negotiation phase. This overcomes the problems inherent in the conventional approaches (e.g., in IEEE 802.16), where the terminal is required to wait for DCD/UCD broadcasts (or any other broadcasts) by the base station, and has no capability to solicit such broadcast messages.

Figure 1:
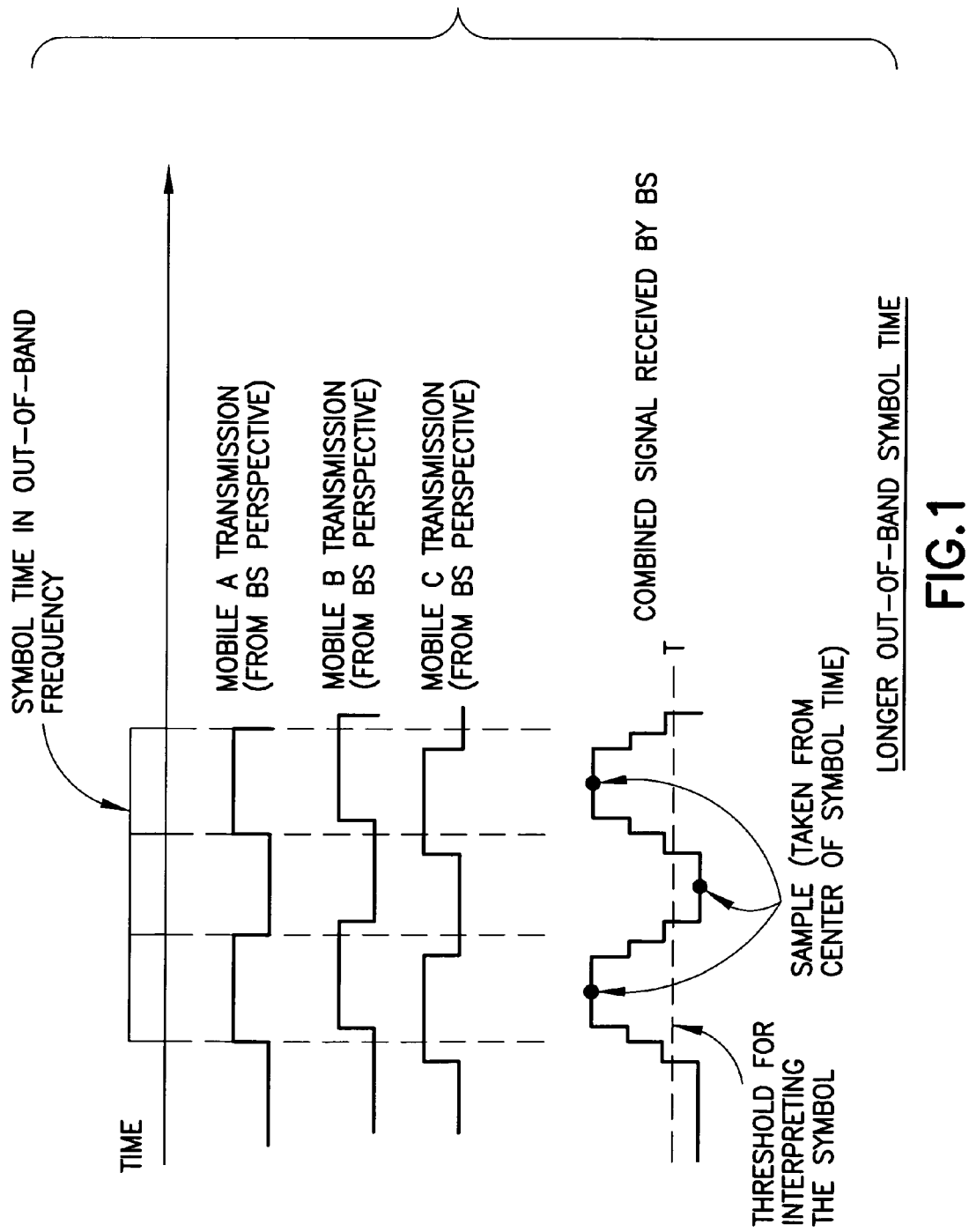
FIG. 1 illustrates how using a longer symbol time in an out-of-band frequency eliminates time drift problems even when multiple terminals are transmitting at the same time.
Figure 5:
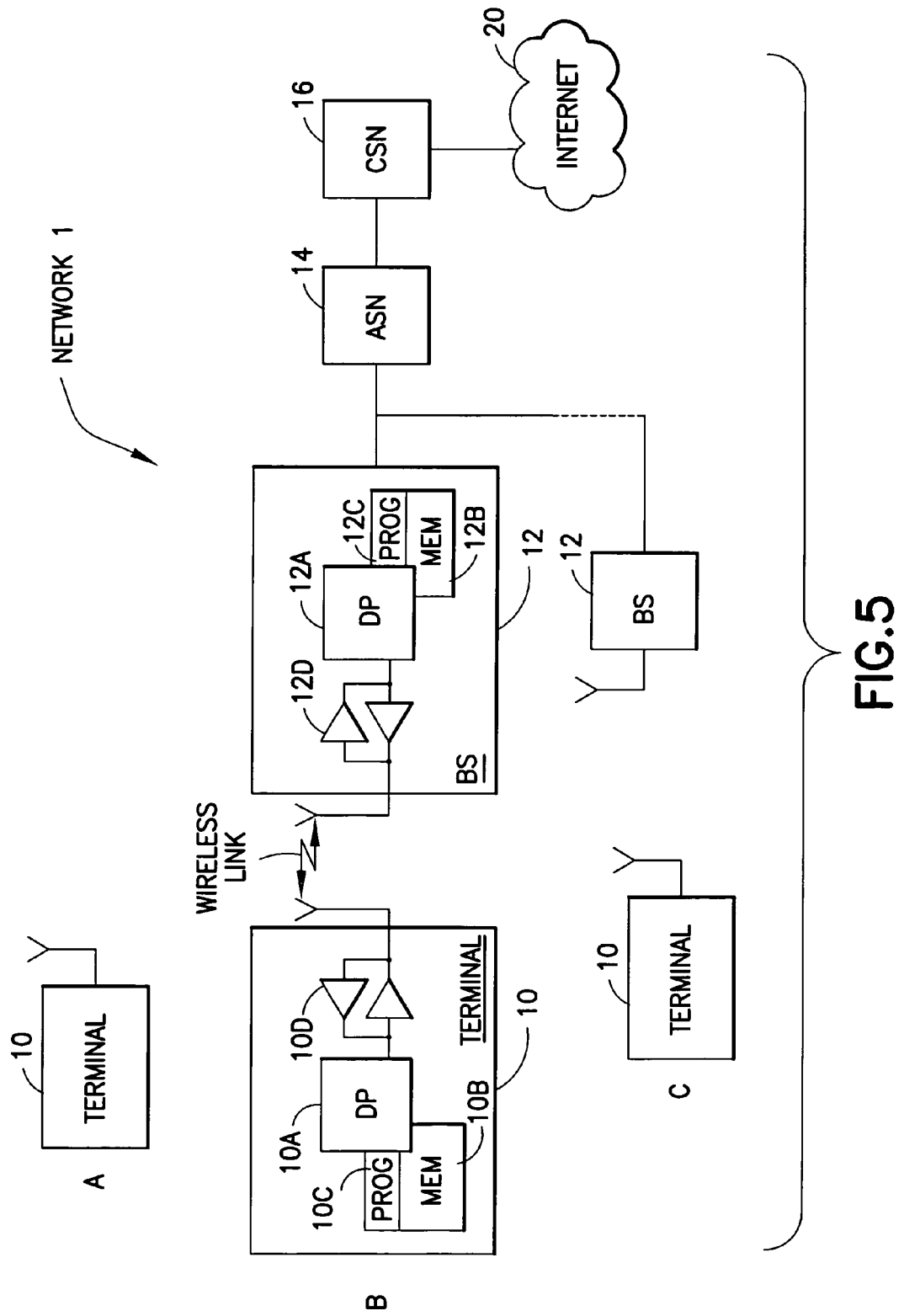
FIG. 5 is a simplified system-level block diagram that illustrates in particular a terminal and a base station that are suitable for embodying the exemplary embodiments of this invention

Reference is made first to FIG. 5 for illustrating a simplified block diagram of various electronic devices that are suitable for use in practicing the exemplary embodiments of this invention. In FIG. 1 a wireless network 1, such as a WiMAX (IEEE 802.16) network, is adapted for communication with an apparatus, that may be or that may form a part of a device also referred to herein for convenience as a terminal 10, via another apparatus that may be embodied as, or that may form a part of a network access node, also referred to herein for convenience as a base station 12 The network 1 includes at least one ASN 14 (that is owned/managed by a NAP) coupled with the BS 12 (typically with a plurality of BSs 12). The network 1 also includes at least one CSN 16 (that is owned/managed by a NSP) coupled with the ASN 14, and which provides connectivity to a wide area network, such as the Internet 20. The terminally includes a controller embodied as at least one data processor (DP) 10A, a memory (MEM) 10B that stores a program (PROG) 10C, and a suitable radio frequency (RF) transceiver 10D for bidirectional wireless communications with the BS 12, which also includes a DP 12A, a MEM 12B that stores a PROG 12C, and a suitable RF transceiver 12D. The PROGs 10C and 12C are assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the terminal 10 and by the DP 12A of the BS 12, or by hardware, or by a combination of software and hardware.

Typically there will be a plurality of terminals 10 serviced by the BS(s) 12. The terminals 10 (designated for convenience in FIG. 5 as A, B and C) may or may not be identically constructed, but in general are all assumed to be electrically and logically compatible with the relevant network protocols and standards needed for operation in the wireless network 1. The ability of the BS 12 to accommodate receiving transmissions from multiple terminals 10 is discussed below in relation to FIGS. 1 and 2.

The various embodiments of the terminal 10 can include, but are not limited to, voice communication devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multicore processor architecture, as several non-limiting examples.

The exemplary embodiments of this invention enable the terminal 10 to use an out-of-band frequency for signaling the base station 12 that DCD/UCD/SII-ADV should be broadcast. Note that the same technique may be used to solicit the BS 12 to broadcast other information as well, and is thus not limited for use with only the DCD/UCD/SII-ADV broadcast messages.

Related to the foregoing is providing the terminal 10 with an ability to determine on out-of-band frequency to transmit a broadcast request, how the transmissions should be timed, and what should be transmitted. The following description addresses these issues and provides various multiple exemplary embodiments for same.

A first aspect of this invention relates to the terminal 10 locating an appropriate out-of-band frequency.

Figure 3:
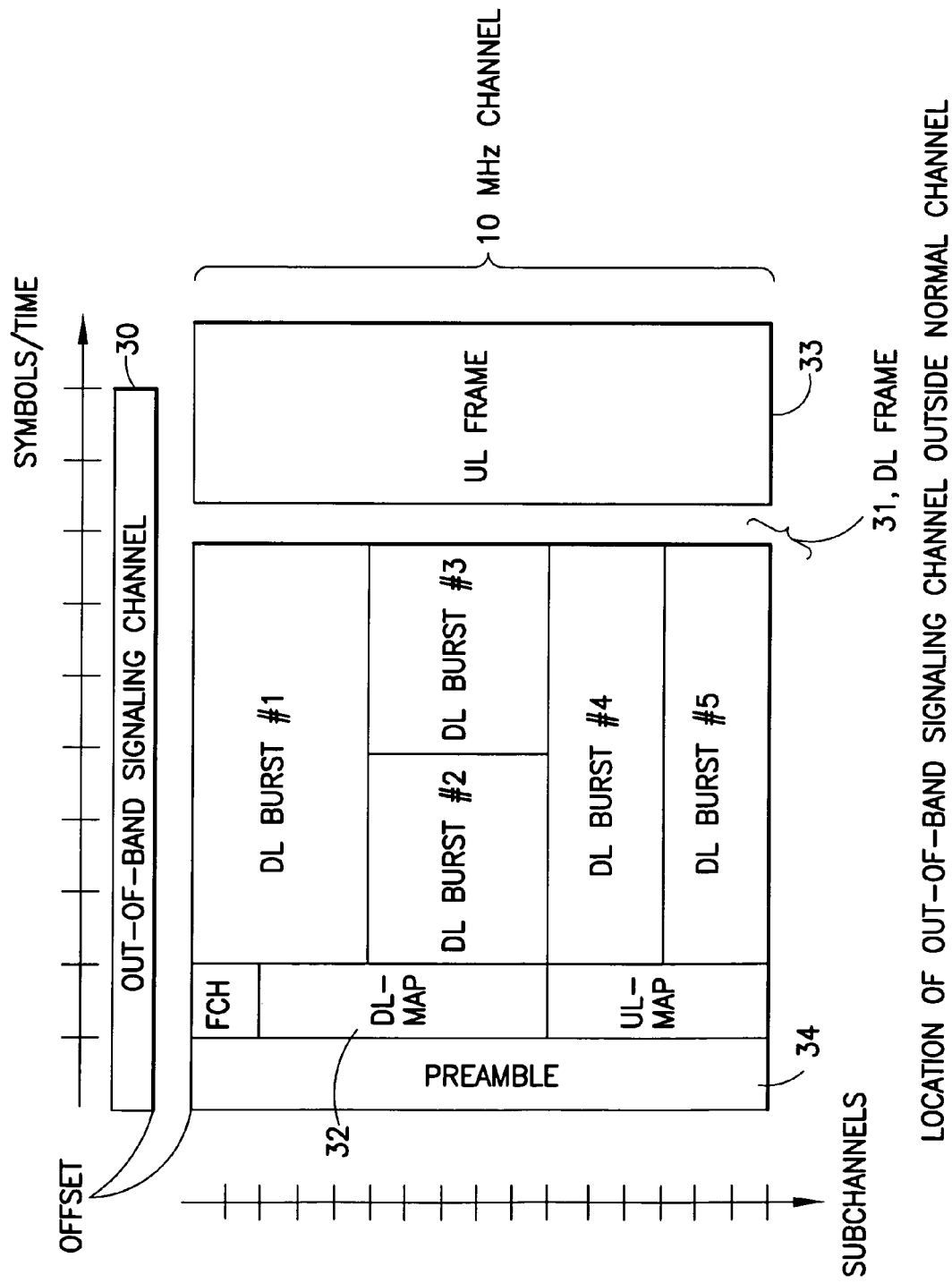
FIG. 3 is one example of the location of an out-of-band signaling channel outside of a normal channel.

In a first embodiment the frequency for use in out-of-band signaling may be defined (explicitly) by a standard document (e.g., in IEEE 802.16) as a (predetermined) fixed frequency, or a (predetermined) relative frequency offset to a current channel frequency used by the base station 12. The offset may be either negative or positive, and may be specified in, for example, units of subchannel bandwidth. In other words, the out-of-band channel may reside at either a higher or a lower frequency than the actual communication channel in use at the time. FIG. 3 shows a non-limiting example of the use of a plurality of time/frequency resources organized as symbols/time versus frequency subchannels within an exemplary 10 MHz bandwidth communication channel established between the BS 12 and the terminal(s) 10. The channel includes a DL frame 31 and an UL frame 33. In this embodiment the out-of-band signaling channel 30 is located at an offset from the first frequency subchannel that is defined for use in conducting terminal/BS communications. It could as well be located at an offset from the last frequency subchannel that is defined for use in conducting terminal/BS communications.

Figure 4:
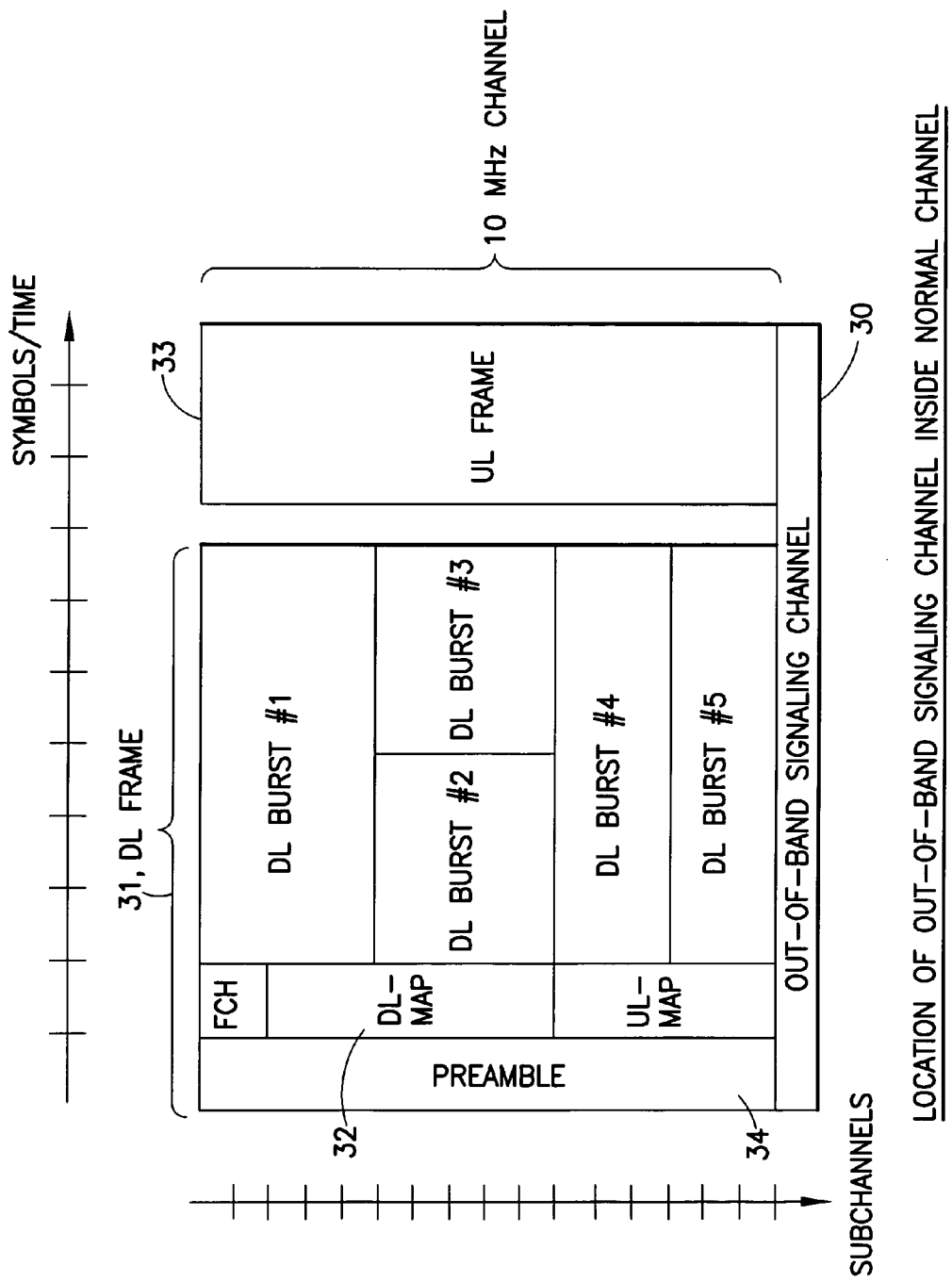
FIG. 4 is one example of the location of an out-of-band signaling channel within the normal channel.

Alternatively, and referring to FIG. 4, the out-of-band signaling channel 30 could reside within the communication channel bandwidth, in which case the BS 12 would not allocate DL traffic to the respective subchannel defined for the out-of-band signaling. In this case, and even though the out-of-band signaling channel lies within the communication channel bandwidth, it may still be considered as being "out-of-band" since it is not used for conducting the normal communications between the terminals(s) 10 and the BS 12.

In a second embodiment, similar in some respects to the first embodiment, the base station 12 advertises whether it supports the use of the out-of-band signaling channel. This advertisement can be made in, for example, a frequently sent MAC message such as the DL-MAP 32.

In a third embodiment the applicable standard may define a plurality of (predetermined) offsets or fixed frequencies that can be used. The out-of-band offset or fixed frequency to be used is then indicated in the frequently sent MAC message (e.g., DL-MAP 32) as, for example, an index. That is, the standard defines that index 1 corresponds to offset/fixed frequency X, index 2 corresponds to offset/fixed frequency Y, etc. The index in the MAC message (e.g., DL-MAP 32) may thus be represented using just a few bits to conserve bandwidth and reduce signaling overhead.

In a fourth embodiment the BS 12 advertises (announces) a specific (explicit) offset or fixed frequency in the frequently sent MAC message (e.g., DL-MAP 32). This embodiment, however, may require more bandwidth than the previous embodiment.

A second aspect of this invention relates to the terminal 10 timing the transmission of the request for the broadcast transmission on the out-of-band signaling channel.

In a first embodiment, the terminal 10 times the transmission to begin at the start of the DL frame (starting either from preamble 34 or after the preamble 34).

In a second embodiment the terminal 10 times the transmission to begin at a relative offset to the start of the DL frame 31, where the offset value is defined in the applicable standard.

In a third embodiment the terminal 10 times the transmission to begin at the start of the UL frame 33.

In a fourth embodiment the terminal 10 times the transmission to begin at a relative offset to the start of the UL frame 33, where the offset value is defined in the applicable standard.

In a fifth embodiment the base station 12 advertises the timing offset in the frequently sent MAC message (e.g., in the DL-MAP 32) as either an index value or as a fixed timing relative to, e.g., the start of the DL frame 31.

A further aspect of this invention relates to what the terminal 10 sends in the out-of-band signaling channel.

The exact content (bit pattern/message) of the UL signaling request sent on the out-of-band signaling channel may take any number of suitable forms. However, the type of modulation and other parameters are assumed to be defined, such as by the applicable standard.

A consideration is also made of the fact that two or more terminals 10 may transmit simultaneously, and it is desirable that they do not interfere with one another. Note that terminals 10 at different locations and distances relative to the BS 12 may time their transmissions based on when they receive DL frames, and therefore can transmit at slightly different times. Ideally, the existence of such timing differences should not matter to the BS 12 receiver. One approach may use multiple symbol lengths as compared to normal frames for representing one symbol in the UL bit pattern/message in order to tolerate timing drift. As is shown in FIG. 1, the received signals from terminals A-C are additively combined at the BS 12 receiver, and the base station 12 need then only sample the received signal(s) at the center of the symbol time and compare the combined signal energy to some threshold T to determine if at least one terminal 10 has made a request on the out-of-band channel 30 to receive a UCD/DCD/SII-ADV broadcast. In this case the timing differences between terminal 10 UL transmissions are not of concern.

In addition, it is desirable to accommodate the situation here different terminals 10 make simultaneous requests for different DL broadcast information such that the base station 12 can detect and resolve the different (overlapping) requests. This need is addressed by selecting the bit pattern/message for requesting DCD/UCD and SII-ADV so that, should they overlap in time at the BS 12 receiver, both types of requests can be identified.

Figure 2:
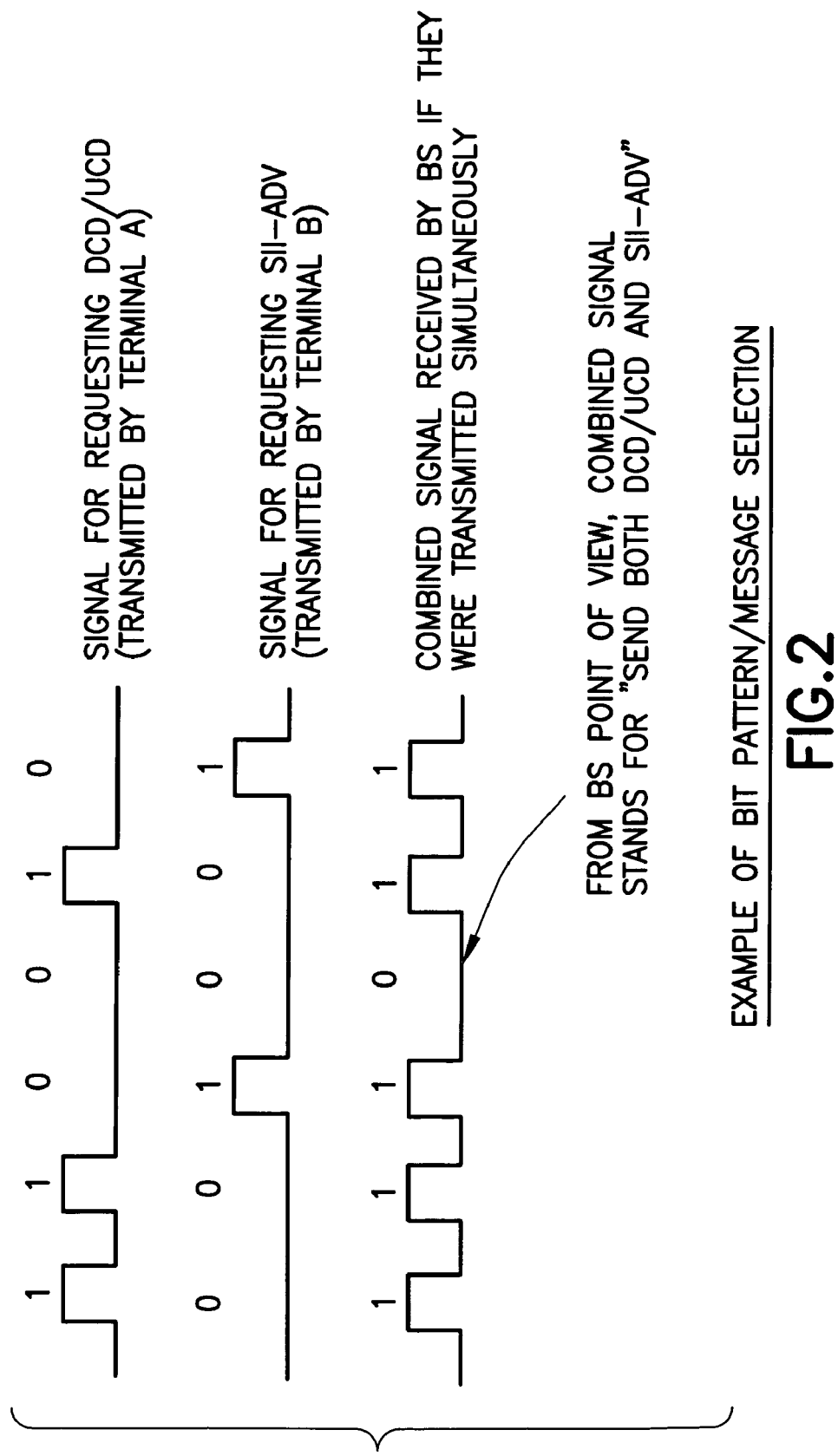
FIG. 2 is an example of bit pattern/message selection, and illustrates that if bit patterns/messages are selected properly, the bit patterns/messages can be sent simultaneously and the BS receiver is still able to service the multiple requests.

FIG. 2 shows a non-limiting example where the DCD/UCD request transmitted by terminal A has three bits set (e.g., "110010") and where the SII-ADV request transmitted by terminal B has two bits set (e.g., "001001"). At the BS 12 receiver the resulting bit stream that is detected is "111011". In operation the BS 12 responds to receiving "110010" by broadcasting DCD/UCD, responds to receiving "001001" by broadcasting SII-ADV, and responds to receiving "111011" by broadcasting both DCD/UCD and SII-ADV, thereby satisfying the requests made by both terminal A and terminal B.

As may be appreciated, these exemplary embodiments of the invention may be considered as providing an UL random access type of channel that is used by the terminals 10 for requesting at least one or more types of broadcast transmissions from the BS 12, where the UL channel is substantially immune to collisions between the UL terminal 10 transmissions.

Based on the foregoing it should be apparent that the exemplary embodiments of this invention provide a method, apparatus and computer program product(s) to request a network access node to transmit a broadcast message, where the request is sent on an out-of-band UL channel.

Figure 6:
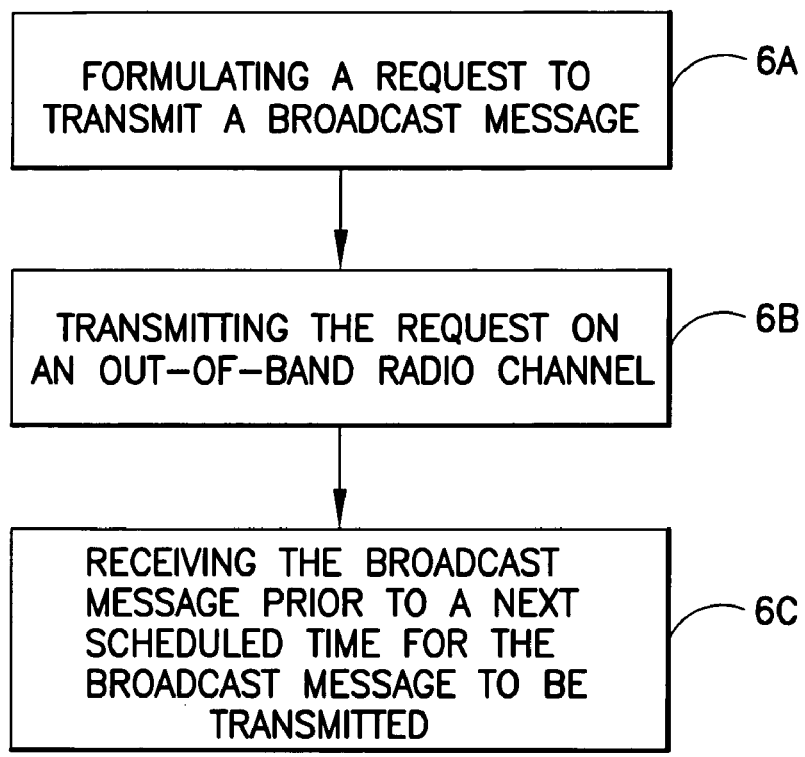
FIG. 6 is a logic flow diagram that illustrates the operation of a method, and a result of execution of computer program instructions, in accordance with the exemplary embodiments of this invention.

FIG. 6 is a logic flow diagram that illustrates the operation of a method, and a result of execution of computer program instructions, in accordance with the exemplary embodiments of this invention.

(A) At Block 6A there is a step and operation of formulating a request to transmit a broadcast message; at Block 6B there is a step and operation of transmitting the request on an out-of-band radio channel; and at Block 6C there is a step and operation of receiving the broadcast message prior to a next scheduled time for the broadcast message to be transmitted (B) In the execution of the method and computer program instructions of the preceding paragraph, where the broadcast message is comprised of at least one of a DCD or a UCD message.

(C) In the execution of the method and computer program instructions of the preceding paragraphs where the broadcast message is comprised of a SII-ADV message.

(D) In the execution of the method and computer program instructions of the preceding paragraphs, where the out-of-band radio channel is outside of a communication channel used for communication between the terminal and the network access node, or is inside of the communication channel used for communication between the terminal and the network access node.

(E) In the execution of the method and computer program instructions of the preceding paragraph, where the out-of-band radio channel is specified explicitly by one of a standard or the network access node.

(F) In the execution of the method and computer program instructions of paragraph (D), where a frequency offset of the out-of-band radio channel relative to the communication channel is specified explicitly by one of a standard or the network access node.

(G) In the execution of the method and computer program instructions of paragraph (D), where there are a plurality of out-of-band radio channels that are explicitly defined for use, further comprising receiving from the network access node an index value that specifies one of the plurality of out-of-band radio channels for use by the terminal.

(H) In the execution of the method and computer program instructions of paragraph (D), where there are a plurality of frequency offsets of the out-of-band radio channel relative to the communication channel that are explicitly defined for use, further comprising receiving from the network access node an index value that specifies one of the plurality of frequency offsets for use by the terminal.

(I) In the execution of the method and computer program instructions of paragraph (A), where transmitting occurs at a time that coincides with one of a start of a DL frame or an UL frame, as specified explicitly by one of a standard or the network access node, or where transmitting occurs at a time that is offset from one of the start of the DL frame or the UL frame, where the offset value is specified explicitly by one of a standard or the network access node.

(J) In the execution of the method and computer program instructions of paragraph (I), where there are a plurality of offset values, further comprising receiving from the network access node an index value that specifies one of the plurality of offset values for use by the terminal.

(K) In the execution of the method and computer program instructions of paragraph (A), where the request is a first type of request that is formulated to have a bit pattern that is substantially immune to an occurrence of a collision with a second type of request made by another terminal.

(L) In the execution of the method and computer program instructions of paragraph (A), further comprising receiving an indication from the network access node in an in-band downlink message whether it supports the use of the out-of-band radio channel.

Figure 7:
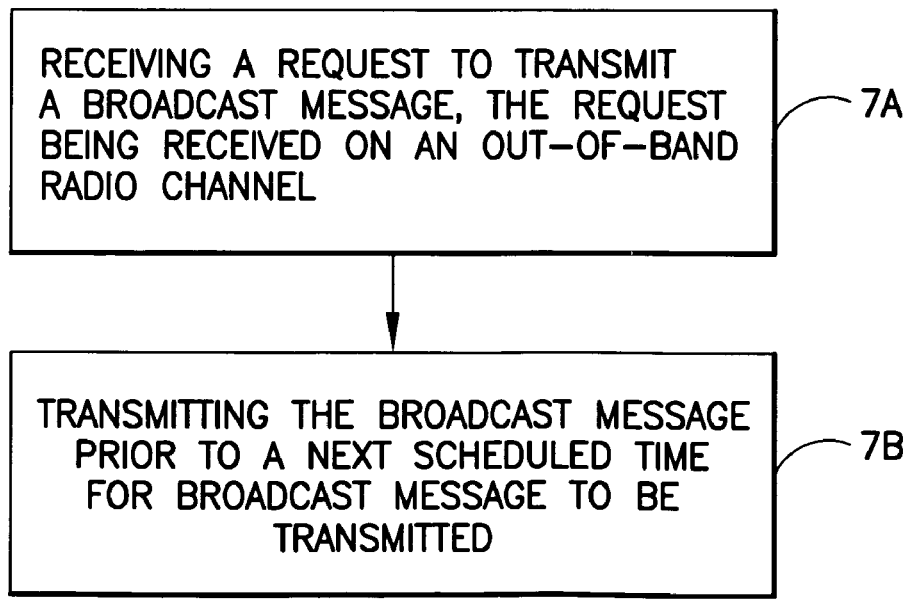
FIG. 7 is a logic flow diagram that illustrates the operation of a method, and a result of execution of computer program instructions, further in accordance with the exemplary embodiments of this invention.

FIG. 7 is a logic flow diagram that illustrates the operation of a method, and a result of execution of computer program instructions, further in accordance with the exemplary embodiments of this invention.

(A) At Block 7A there is a step and operation of receiving a request to transmit a broadcast message, the request being received on an out-of-band radio channel; and at Block 7B there is a step and operation of transmitting the broadcast message prior to a next scheduled time for the broadcast message to be transmitted.

(B) In the execution of the method and computer program instructions of the preceding paragraph, the broadcast message is comprised of at least one of a DCD, UCD and a SII-ADV message.

(C) In the execution of the method and computer program instructions of the preceding paragraphs, where the out-of-band radio channel is outside of a communication channel used for communication between the terminal and the network access node, or is inside of the communication channel used for communication between the terminal and the network access node.

(D) In the execution of the method and computer program instructions of paragraph (C), where the out-of-band radio channel is specified explicitly by one of a standard or by the network access node.

(E) In the execution of the method and computer program instructions of paragraph (C), where a frequency offset of the out-of-band radio channel relative to the communication channel is specified explicitly by one of a standard or by the network access node.

(F) In the execution of the method and computer program instructions of paragraph (C), where there are a plurality of out-of-band radio channels that are explicitly defined for use, further comprising transmitting an index value that specifies one of the plurality of out-of-band radio channels for use by the terminal.

(G) In the execution of the method and computer program instructions of paragraph (C), where there are a plurality of frequency offsets of the out-of-band radio channel relative to the communication channel that are explicitly defined for use, further comprising transmitting an index value that specifies one of the plurality of frequency offsets for use by the terminal.

(H) In the execution of the method and computer program instructions of paragraph (A), where receiving occurs at a time that coincides with one of a start of a DL frame or an UL frame, as specified explicitly by one of a standard or by the network access node, or where receiving occurs at a time that is offset from one of the start of the DL frame or the UL frame, where the offset value is specified explicitly by one of a standard or by the network access node.

(I) In the execution of the method and computer program instructions of paragraph (H), where there are a plurality of offset values, further comprising transmitting an index value that specifies one of the plurality of offset values for use by the terminal.

(J) In the execution of the method and computer program instructions of paragraph (A), where the request is a first type of request having a bit pattern that is substantially immune to an occurrence of a collision with a second type of request made by another terminal.

(K) In the execution of the method and computer program instructions of paragraph (A), further comprising sampling the received signal at about a center of a symbol time and comparing the sampled received signal to a threshold value.

(L) In the execution of the method and computer program instructions of paragraph (A), further comprising transmitting an indication in an in-band downlink message whether the network access node supports the use of the out-of-band radio channel.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WiMAX system, it should be appreciated that the exemplary embodiments of this invention are not limited for use with only this one particular type of wireless communication system, and that they may be used to advantage in other wireless communication systems.

Furthermore, it should be noted that the exemplary embodiments of this invention may be used in, for example, time division duplex (TDD) or frequency division duplex (FDD) types of communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
  formulating a request for a network access node to transmit a broadcast message;
  transmitting the request on an out-of-band radio channel; and
  receiving the broadcast message prior to a next scheduled time for the broadcast message to be transmitted,
  where the broadcast message comprises parameters for initiating communication between the network access node and a terminal.

2. The method of claim 1, where the broadcast message comprises at least one of a downlink channel descriptor, an uplink channel descriptor, or a system identity information advertisement message.

3. The method of claim 1, where the out-of-band radio channel is outside of a communication channel used for communication between the terminal and the network access node, or is inside of the communication channel used for communication between the terminal and the network access node.

4. The method of claim 3, where there are a plurality of out-of-band radio channels that are explicitly defined for use, further comprising receiving from the network access node an index value that specifies one of the plurality of out-of-band radio channels for use by the terminal.

5. The method of claim 3, where there are a plurality of frequency offsets of the out-of-band radio channel relative to the communication channel that are explicitly defined for use, further comprising receiving from the network access node an index value that specifies one of the plurality of frequency offsets for use by the terminal.

6. The method of claim 1, where transmitting occurs at a time that coincides with a start of one of a downlink frame or an uplink frame, as specified explicitly by one of a standard or by the network access node, or where transmitting occurs at a time that is offset from the start of the one of the downlink frame or the uplink frame, where the offset value is specified explicitly by one of a standard or the network access node.

7. The method of claim 6, where there are a plurality of offset values, further comprising receiving from the network access node an index value that specifies one of the plurality of offset values.

8. The method of claim 1, where the request is a first type of request that is formulated by the terminal making the request to have a bit pattern that is substantially immune to an occurrence of a collision with a second type of request made by another terminal.

9. The method of claim 1, further comprising receiving an indication from the network access node in an in-band downlink message indicating whether the network access node supports the use of the out-of-band radio channel.

10. A non-transitory computer readable medium tangibly encoded with a computer program executable by a processor to perform actions comprising:
   formulating a request for a network access node to transmit a broadcast message;
   transmitting the request on an out-of-band radio channel; and
   receiving the broadcast message prior to a next scheduled time for the broadcast message to be transmitted,
   where the broadcast message comprises parameters for initiating communication between the network access node and a terminal.

11. The memory medium of claim 10, where the broadcast message comprises at least one of a downlink channel descriptor, uplink channel descriptor or a system identity information advertisement,
   where the request is a first type of request having a bit pattern that is substantially immune to an occurrence of a collision with a second type of request made by another terminal,
   where the out-of-band radio channel is outside of a communication channel used for communication between the terminal and the network access node, or is inside of the communication channel used for communication between the terminal and the network access node,
   where there are a plurality of out-of-band radio channels that are explicitly defined for use, said actions further comprise receiving an index value that specifies one of the plurality of out-of-band radio channels for use, or
   where there are a plurality of frequency offsets of the out-of-band radio channel relative to the communication channel that are explicitly defined for use, and said actions further comprise receiving an index value that specifies one of the plurality of frequency offsets for use.

12. An apparatus, comprising at least one processor; and at least one memory including computer program code, the at least one memory and the computer program code configured to, with the at least one processor, cause the apparatus to perform at least the following:
   to formulate a request for a network access node to transmit a broadcast message,
   to transmit the request on an out-of-band radio channel for reception by the network access node and
   to receive the broadcast message prior to a next scheduled time for the broadcast message to be transmitted,
   where the broadcast message comprises parameters for initiating communication between the network access node and a terminal.

13. The apparatus of claim 12, where the broadcast message comprises at least one of a downlink channel descriptor, an uplink channel descriptor or a system identity information advertisement message.

14. The apparatus of claim 12, where the out-of-band radio channel is outside of a communication channel used for communication between the apparatus and the network access node, or is inside of the communication channel used for communication between the apparatus and the network access node.

15. The apparatus of claim 12, where there are a plurality of out-of-band radio channels that are explicitly defined for use, said the at least one memory and the computer program code are further configured to cause the apparatus to receive from the network access node an index value that specifies one of the plurality of out-of-band radio channels for use by the apparatus.

16. The apparatus of claim 12, where there are a plurality of frequency offsets of the out-of-band radio channel relative to the communication channel that are explicitly defined for use, said the at least one memory and the computer program code are further configured to cause the apparatus to receive from the network access node an index value that specifies one of the plurality of frequency offsets for use by the apparatus.

17. The apparatus of claim 12, where said the at least one memory and the computer program code are further configured to cause the apparatus to transmit the request at a time that coincides with a start of one of a downlink frame or an uplink frame, as specified explicitly by one of a standard or the network access node, or to transmit the request at a time that is offset from the start of the one of the downlink frame or the uplink frame, where the offset value is specified explicitly by one of a standard or the network access node.

18. The apparatus of claim 17, where there are a plurality of offset values and where one of the plurality of offset values is specified by downlink signaling received from the network access node.

19. The apparatus of claim 12, where the request is a first type of request that is formulated to have a bit pattern that is substantially immune to an occurrence of a collision with a second type of request made by another apparatus.

20. The apparatus of claim 15, said the at least one memory and the computer program code are further configured to cause the apparatus to receive an indication from the network access node in an in-band downlink message whether the network access node supports the use of the out-of-band radio channel.

21. The apparatus of claim 12, embodied at least partially in at least one integrated circuit.

22. A method comprising:
   receiving a request to transmit a broadcast message, the request being received on an out-of-band radio channel; and
   transmitting the broadcast message prior to a next scheduled time for the broadcast message to be transmitted,
   where the broadcast message comprises parameters for initiating communication between a network access node and a terminal.

23. The method of claim 22, where the broadcast message comprises at least one of a downlink channel descriptor, uplink channel descriptor or a system identity information advertisement message.

24. The method of claim 22, where the out-of-band radio channel is outside of a communication channel used for communication between the terminal and the network access node, or is inside of the communication channel used for communication between the terminal and the network access node.

25. The method of claim 22, where there are a plurality of out-of-band radio channels that are explicitly defined for use, further comprising transmitting an index value that specifies one of the plurality of out-of-band radio channels for use.

26. The method of claim 22, where there are a plurality of frequency offsets of the out-of-band radio channel relative to a communication channel that are explicitly defined for use, further comprising transmitting an index value that specifies one of the plurality of frequency offsets for use.

27. The method of claim 22, where receiving occurs at a time that coincides with a start of one of a downlink frame or an uplink frame, as specified explicitly by one of a standard or by the network access node, or
where receiving occurs at a time that is offset from the start of the one of the downlink frame or the uplink frame, where the offset value is specified explicitly by one of a standard or by the network access node.

28. The method of claim 27, where there are a plurality of offset values, further comprising transmitting an index value that specifies one of the plurality of offset values for use.

29. The method of claim 22, where the request is a first type of request received from the terminal and has a bit pattern that is substantially immune to an occurrence of a collision with a second type of request made by another terminal.

30. The method of claim 22, further comprising sampling the received signal at about a center of a symbol time and comparing the sampled received signal to a threshold value.

31. The method of claim 22, further comprising transmitting an indication in an in-band downlink message whether the network access node supports the use of the out-of-band radio channel.

32. A non-transitory computer readable medium tangibly encoded with a computer program executable by a processor to perform actions comprising:
receiving a request to transmit a broadcast message, the request being received on an out-of-band radio channel; and
transmitting the broadcast message prior to a next scheduled time for the broadcast message to be transmitted,
where the broadcast message comprises parameters for initiating communication between a network access node and a terminal.

33. The memory medium of claim 32, where the broadcast message comprises at least one of a downlink channel descriptor, uplink channel descriptor or a system identity information advertisement,
where the request is a first type of request having a bit pattern that is substantially immune to an occurrence of a collision with a second type of request made by another terminal,
where the out-of-band radio channel is outside of a communication channel used for communication between the terminal and the network access node, or is inside of the communication channel used for communication between the terminal and the network access node,
where there are a plurality of out-of-band radio channels that are explicitly defined for use, said actions further comprise transmitting an index value that specifies one of the plurality of out-of-band radio channels for use, or
where there are a plurality of frequency offsets of the out-of-band radio channel relative to the communication channel that are explicitly defined for use, and said actions further comprise transmitting an index value that specifies one of the plurality of frequency offsets for use.

34. An apparatus, comprising at least one processor; and at least one memory including computer program code, the at least one memory and the computer program code configured to, with the at least one processor, cause the apparatus to perform at least the following:
to receive a request from at least one terminal, the request being a request to transmit a broadcast message, the request being received on an out-of-band radio channel, and
to transmit the broadcast message prior to a next scheduled time for the broadcast message to be transmitted,
where the broadcast message comprises parameters for initiating communication between a network access node and the at least one terminal.

35. The apparatus of claim 34, where the broadcast message comprises at least one of a downlink channel descriptor, uplink channel descriptor or a system identity information advertisement,
where the request is a first type of request having a bit pattern that is substantially immune to an occurrence of a collision with a second type of request made by another terminal, and
where the at least one memory and the computer program code are further configured to cause the apparatus to sample the received signal at about a center of a symbol time and to compare the sampled received signal to a threshold value.

36. The apparatus of claim 34, where the out-of-band radio channel is outside of a communication channel used for communication between a terminal and a network access node, or is inside of the communication channel used for communication between the terminal and the network access node,
where there are a plurality of out-of-band radio channels that are explicitly defined for use, the at least one memory and the computer program code are further configured to cause the apparatus to transmit an index value that specifies one of the plurality of out-of-band radio channels for use by the terminal, or
where there are a plurality of frequency offsets of the out-of-band radio channel relative to the communication channel that are explicitly defined for use, and the at least one memory and the computer program code are further configured to cause the apparatus to transmit an index value that specifies one of the plurality of frequency offsets for use by the terminal.

37. The apparatus of claim 34, where the request is received at a time that coincides with a start of one of a downlink frame or an uplink frame, as specified explicitly by one of a standard or by a network access node, or
where the request is received at a time that is offset from the start of the one of the downlink frame or the uplink frame,
where the offset value is specified explicitly by one of a standard or by the network access node,
where there are a plurality of offset values, and
where the at least one memory and the computer program code are further configured to cause the apparatus to transmit an index value that specifies one of the plurality of offset values for use by the terminal.

38. The apparatus of claim 34, embodied at least partially in at least one integrated circuit.

* * * * *